July 29, 1969    D. E. MAGUIRE    3,458,803
APPARATUS AND METHOD FOR DIRECTLY MEASURING
CAPACITANCE AND DISSIPATION
FACTOR OF CAPACITORS
Filed March 21, 1966

INVENTOR
DAVID E. MAGUIRE

ATTORNEYS

United States Patent Office

3,458,803
Patented July 29, 1969

3,458,803
APPARATUS AND METHOD FOR DIRECTLY MEASURING CAPACITANCE AND DISSIPATION FACTOR OF CAPACITORS
David E. Maguire, Lakewood, Ohio (30 Bridgewater Drive, Botany Woods, Greenville, S.C. 29607)
Filed Mar. 21, 1966, Ser. No. 541,905
Int. Cl. G01r 11/52, 27/26
U.S. Cl. 324—60                    7 Claims

ABSTRACT OF THE DISCLOSURE

A measuring system for directly indicating the capacitance and dissipation factor of a capacitor. A constant frequency alternating voltage source is coupled to a capacitor to produce reactive and resistive potential drops across the capacitor. A first phase comparison and control circuit is provided to maintain the reactive component of potential drop at a substantially constant predetermined level so that the current through said capacitor is directly proportional to the capacitance thereof. A second phase comparison circuit is employed to determine the resistive component of capacitor potential drop which is proportional to the dissipation factor of the capacitor.

---

This invention relates to methods of determining electrical parameters and electrical measuring systems employing these methods, and more particularly to methods and systems for directly measuring the capacitance and dissipation factor of a capacitor.

Numerous forms of capacitance measuring systems are known in the art, however, these systems practically uniformly employ a bridge-type arrangement in which an unknown capacitance is balanced against one or more passive impedance elements in opposite arms of a bridge circuit. The ultimate determination of the unknown capacitance is achieved by observing the values of the passive impedance elements required to produce a balance in the bridge circuit. For this reason, the bridge method and circuit can be considered an indirect method and apparatus for determining the unknown capacitance of a capacitor. Recently the bridge-type balancing operations have been automated by employing servo systems in an effort to increase the rate of determination of unknown capacitances. However, the accuracies and speeds achieved by these automated systems are limited to the linearity and accuracy of the bridge components and the remaining requirement for sequential balancing of the bridge arms.

Accordingly, it is an object of this invention to provide an improved capacitance measuring system.

Another object of this invention is to provide a direct capacitance measuring system in which the values of capacitance and dissipation factor of a capacitor are determined directly.

A further object of this invention is to provide a capacitance measuring system in which a direct current bias may be applied to the capacitor during the measurement to duplicate the combined alternating and direct current voltages to which the capacitor will be subjected in any predetermined circuit and to determine the effect of such combined electrical stresses upon the capacitance and dissipation factor of the capacitor.

Another object of this invention is to provide an improved method for capacitor testing in which the values of capacitance and dissipation factor are determined directly.

Still another object of this invention is to provide a capacitor measuring system which is simple and economical in construction, reliable in operation, and can be operated by an unskilled technician.

A further object of this invention is to provide a capacitor measuring system which is capable of greater speed and accuracy than the prior art devices.

Briefly in accordance with aspects of this invention, a system is provided for measuring the capacitance and dissipation factor of a capacitor under test which system includes a parameter vector voltage converter and voltage control circuit, a direct current voltage connected to the control circuit, an alternating voltage source coupled to the capacitor through an automatic gain control circuit which is controlled by the voltage control circuit, means for applying the impedance drop across the capacitor to the voltage control circuit and means for indicating values of the electrical parameters by obtaining the alternating current flowing through and the impedance drop across the capacitor and converting this current and voltage to direct current voltages. Advantageously, a variable direct current bias source may be employed to apply a direct current voltage across the capacitor. Thus the alternating current capacitance indicating signal and a direct current potential may be applied to the test capacitor to duplicate the electrical stresses to which the capacitor are to be subjected in a given circuit. It is well-known that undesirable capacitor leakage currents may flow when the capacitor is subjected to direct current potentials. This testing system and method will indicate these direct current leakage currents as dissipation factor.

In accordance with other aspects of this invention, a novel method is provided for testing capacitors and directly determining the values of capacitance and dissipation factor. This method includes the steps of passing an alternating current through the capacitor which alternating current is of constant frequency and controlled applied potential, multiplying this current by a constant multiplying factor, converting the current to a direct current voltage and measuring the direct current voltage on a direct current voltmeter which is calibrated in capacitance. The potential at which the alternating current is applied to the capacitor is controlled to produce a constant amplitude quadrature vector potential drop across the test capacitor. The current flowing through the test capacitor is compared in magnitude and phase with the impedance potential drop across the test capacitor and the result of this comparison is converted into a DC voltage which is read directly on a voltmeter calibrated in terms of dissipation factor. The method may include the steps of applying an adjustable direct current potential across the test capacitor to determine the effect of the combination of electrical stresses upon the capacitance and dissipation factor measurements.

It is an important feature of this invention to measure the capacitance of a test capacitor by directly measuring the alternating current flow through the capacitor while controlling the applied potential to produce a constant amplitude quadrature vector potential drop across the test capacitor. Another feature of this invention is the provision of a capacitance measuring system is which the measured value of capacitance is independent of the equivalent series resistance of the capacitor under test.

Advantageously, the system provides for the direct measurement of the series capacitance and equivalent series resistance of a capacitor expressed as dissipation factor at audio frequencies over the range of .0001 microfarads to 10,000 microfarads with dissipation factors from 0.0% to 200%. The accuracy of measurement of the system is at least .1% for capacitance and .2% for dissipation factors and the measurement time for both parameters is less than ½-second. In addition, the system is insensitve to lead resistance and stray capacitance.

These and various other objects, features and advantages of the invention will be more clearly understood from a reading of the detailed description of the invention in conjunction with the drawing in which.

Figure 1:
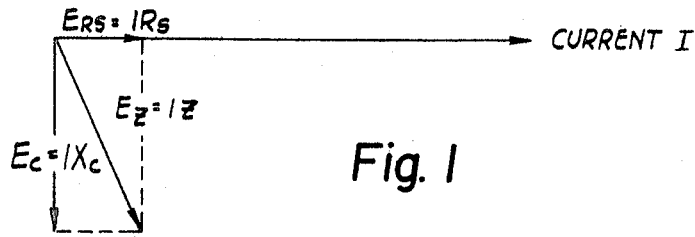
FIGURE 1 is a vector diagram which will be employed to explain the basic concepts of the invention.

Referring now to the drawing, FIGURE 1 is a vector diagram of a conventional relationship of current and voltage drops relative to a capacitor. The horizontal major vector is labeled "Current I" and the magnitude of this vector is directly proportional to the current flowing through a capacitor. A shorter voltage vector labeled "$E_{R_s}$" is superimposed upon the current vector and is equal to the product of the current I flowing through the capacitor times the equivalent series resistance $R_s$ of the capacitor. A vertically extending voltage vector $E_c$, which extends downwardly at an angle of 90° relative to the current vector I is equal to the product of the current I flowing through the capacitor and the reactance $X_c$ of the capacitor. The diagonal vector of the parallelogram formed by the voltage vectors $E_{R_s}$ and $E_c$ lines formed parallel thereto is the voltage vector labeled $E_z$ which is equal to the product of the current I flowing through the capacitor and the series impedance Z of the capacitor. These vectorial relationships of current and voltage drops are well-known in the art and these relationships will be employed to describe the fundamental concepts involved in this invention.

Because $E_c = IX_c$, the current flow I may be expressed as:

$$I = E_c/X_c = 2\pi f C E_c = \omega C E_c \quad (1)$$

where $\omega = 2\pi f$.

By holding the amplitude of $E_c$ constant along with a fixed measurement frequency $f$, the magnitude of the current flow I becomes directly proportional to the equivalent series capacitance, C.

$$I = KC, \text{ where K is a constant} = \omega E_c \quad (2)$$

If the current I is now caused to flow through a chosen standard resistor $R_{std}$, a voltage $E_{R_{std}}$ will be developed across the resistor whose magnitude will be directly proportional to the current flowing and thus directly proportional to the equivalent series capacitance.

$$E_{R_{std}} = IR_{std} = (2\pi f C_c R_{std})C \quad (3)$$

Now by employing a fixed frequency $f$, the constant amplitude of the vector voltage $E_c$, and the chosen standard resistor $R_{std}$, a resultant voltage $E_{R_{std}}$ can be obtained whose magnitude in volts will correspond to the value of the unknown capacitance, C in microfarads, or some decade multiple thereof, as will be subsequently described.

The dissipation factor of the unknown capacitance element is defined as the ratio of the equivalent series resistance ($R_s$) to the equivalent series reactance ($X_c$).

$$D.F. = R_s/X_c \quad (4)$$

Now, multiplying both numerator and denominator by the current I, $$D.F. = IR_s/IX_c = E_{R_s}/E_c \quad (5)$$

But, in the measurement of capacitance above, the amplitude of the vector voltage $E_c$ is held constant and therefore the dissipation factor is directly proportional to the amplitude of the vector voltage $E_{R_s}$. Thus by measuring the amplitude of $E_{R_s}$ with an appropriate scale factor, a direct reading of dissipation factor is obtained on a voltmeter.

Figure 2:
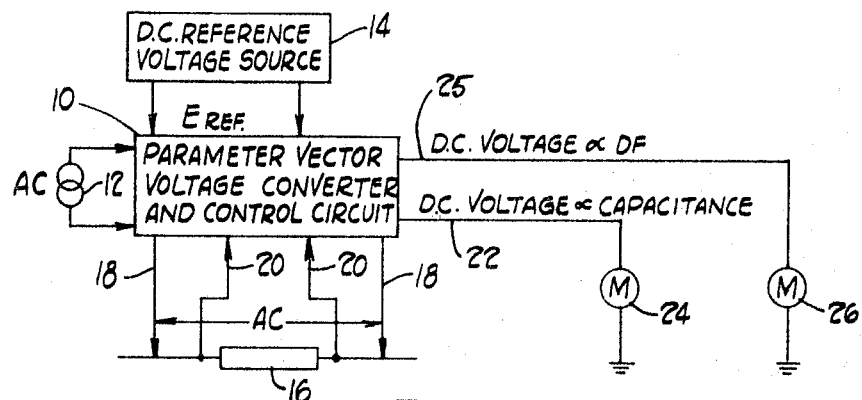
FIGURE 2 is a simplified block diagram of one embodiment of the invention.

It should be noted in the above discussion that the magnitude of the equivalent series resistance $R_s$ does not enter into the determination of equivalent series capacitance C and thus capacitance measurements are completed independent of the magnitude of the equivalent series resistance In a basic or simplified embodiment shown in block and pictorial form in FIGURE 2, a parameter vector converter and control circuit 10 is connected to a source of alternating current 12 having a discrete frequency and to a direct current reference voltage source 14, which applies a potential $E_{ref}$. A capacitor 16, which is to be tested, is connected in series with the alternating current output of such circuit by leads 18, 18. The impedance voltage $E_z$ developed across the test capacitor 16 is applied to the circuit 10 by leads 20, 20.

In operation, a vector voltage $E_c$ corresponding to the desired capacitance to be measured is selected by circuit 10 from the impedance voltage drop "$E_z$," rectified to $E'_c$ compared to the DC reference voltage "$E_{ref}$" and adjusted to be identical with this reference voltage $E_{ref}$ by automatic adjustment of the current I through the test device by circuit 10. The magnitude of the current I is then proportional to the value of the desired capacitance to be measured according to Equation 3 and is converted to a DC output voltage which is applied through lead 22 to an appropriately calibrated meter 24, which may for convenience be a digital type DC voltmeter. Simultaneously, a second DC output voltage $E'_{R_s}$ is generated which is proportional to the equivalent series resistance $E_{R_s}$ of the impedance of the capacitor 16 under test according to Equation 5 and is applied to DC voltmeter 26 through lead 25. Thus the true value of the equivalent series capacitance C is read on meter 24, while the true value of dissipation factor is read on meter 26.

Figure 3:
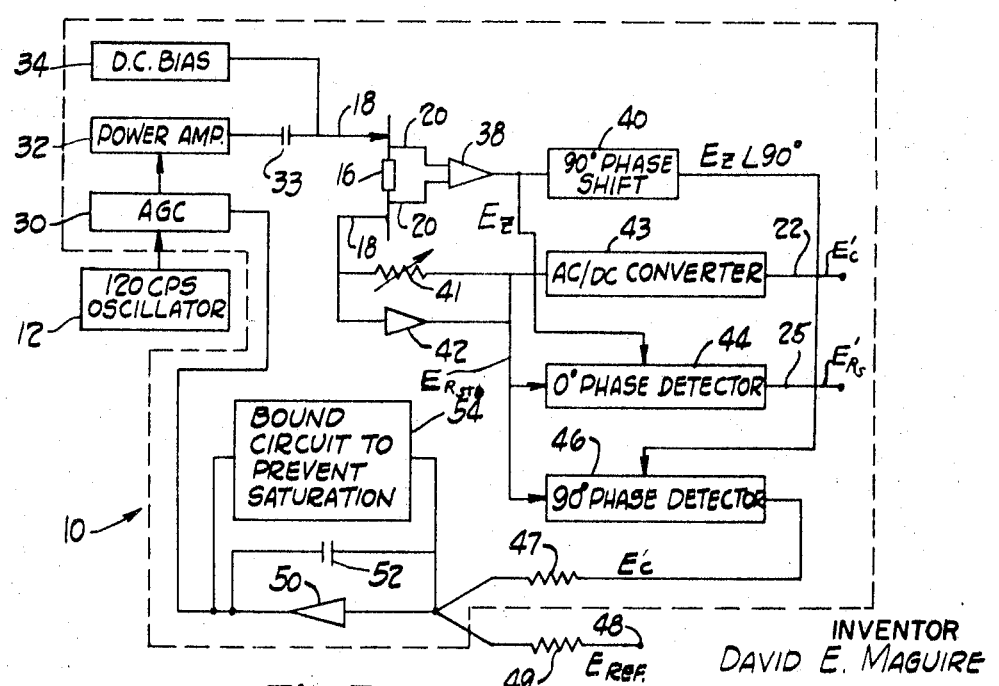
FIGURE 3 is a combined schematic and block diagram of one detailed embodiment of the system of FIGURE 2.

A more detailed embodiment of the invention is shown in FIGURE 3. A test signal is developed in generator 12 which generator is represented as an oscillator. It may, however, be a full wave rectifier which rectifies a 60 c.p.s. line voltage followed by a 120 c.p.s. filter which restores the resultant 120 c.p.s. ripple voltage to a pure sine wave. Because the frequency of the 60 c.p.s. line voltage is extremely well regulated, the 120 c.p.s. test frequency will be constant to the same degree. An additional advantage of the use of a line frequency-locked test signal is the elimination of beat frequency problems arising from stray line voltage pick ups throughout the system.

An automatic gain control circuit 30 is coupled to oscillator 12 and varies the test signal by an amount dependent on the amplitude of the quadrature voltage vector $E_c$ appearing across the capacitance of capacitor 16 and thus acts to maintain this vector voltage constant, as will be further explained below. A power amplifier 32 acts to further amplify the test signal and supply the test signal at a low output impedance. A capacitor 33 is included in the output circuit to allow a ground-referenced bias to be applied to test capacitor 16 if desired from a DC bias source 34. This source of direct current potential is preferably adjustable so that any predetermined potential may be applied to capacitor 16 to duplicate actual circuit operating conditions. Advantageously, however, the presence or absence of the direct current potential across the capacitor does not affect the capacitance measurement of capacitor 16. The capacitance indicating circuit responds only to alternating current. Thus, any leakage currents flowing through capacitor 16 will be rejected by the capacitance indicating circuit. The test capacitor 16 is connected directly in series with the output from amplifier 32 and the impedance voltage drop is measured directly across the leads of capacitor 16 through leads 20, 20. Thus lead resistance in the connections which introduce errors in remote measurements, do not cause errors in the readings of this system. The signal appearing across the capacitor is picked up through a high input impedance differential amplifier 38 having a low impedance output, $E_z$. An output signal from amplifier 38 is fed to a 90° phase shift circuit 40, which, in turn, has an output equal to $E_z$ in amplitude but shifted 90° in phase.

The current I through the test capacitor 16 is proportional to the capacitance thereof and is forced through a standard resistor 41 (indicated as being variable) by a current sensing amplifier 42 having an output voltage, $E_{R_{std}}$. As was mentioned above, this voltage, $E_{R_{std}}$ is also directly proportional to the capacitance of the test capacitor and is measured by applying this voltage through an AC to DC converter 43 and conductor 22 into digital voltmeter 24 (FIGURE 2), although any other current I measurement means may be employed. Resistor 41 is varied through discrete steps in order to select different capacitance scales on meter 24 as follows:

| Ohms: | Microfarads |
| --- | --- |
| 100K | .001 to .01 |
| 10K | .01 to 0.1 |
| 1K | 0.1 to 1.0 |
| 100 | 1.0 to 10.0 |
| 10 | 10 to 100 |
| 1.0 | 100 to 1000 |

The $E_{R_{std}}$ voltage is also utilized as the reference voltage to drive the 0° and 90° phase detectors 44, 46, respectively. Phase detectors 44 may be of the type commonly employed as discriminator circuits. One example of such a circuit is shown in page 389 of a text entitled "Electron Tube Circuits," first edition (1950) by Samuel Seely, a McGraw-Hill Book Co. book. In the instant system, the output voltage divider of the text circuit would have a grounded center-tap rather than a ground on one end and the impedance potential drop, $E_z$ from amplifier 38 of the subject system is inductively coupled between the center-tap of the transformer secondary and ground.

The output of the 0° phase detector 44 is a DC voltage $E'_{R_s}$ exactly proportional to $E_{R_s}$ (the in-phase component of the voltage appearing across the capacitor under test). This DC voltage $E'_{R_s}$ may be read out directly on an appropriately calibrated meter as dissipation factor since $E_c$ (Equation 5) is constant.

The output of the 90° phase detector 46 is a DC voltage $E'_c$ exactly proportional to the quadrature component $E_c$ of the voltage $E_z$ appearing across the capacitor 16 under test. This DC voltage $E'_c$ is applied to a resistor 47 and compared with the DC reference voltage $E_{ref}$ in a control circuit. The reference voltage $E_{ref}$ is applied at terminal 48 and causes current flow through resistor 49 to an operational amplifier 50. The control circuit includes operational amplifier 50, a shunt-connected capacitor 52 and a shunt-connected Bound circuit 54 which merely prevents saturation of the operational amplifier 50 in a manner known in the art. The control circuit compares the DC voltages $E_{ref}$ and $E'_c$ and produces an output signal equal to the negative value of the integral of the difference between $E_{ref}$ and $E'_c$, with respect to time. The output of the control circuit acts to adjust the AGC circuit 30 to cause the error between $E'_c$ and $E_{ref}$ to approach zero—thus holding the alternating voltage $E_c$ at a constant amplitude, which is the condition required to produce the relationship expressed in Equation 2.

While one embodiment of the system and one embodiment of the method have been disclosed in detail, it is understood that the concepts thereof could be employed in other embodiments without departing from the spirit and scope of this invention.

What is claimed is:

1. A measuring system for directly indicating the unknown capacitance and dissipation factor of a capacitor comprising:

an alternating voltage source coupled to said capacitor, means for maintaining a substantially constant output frequency from said alternating voltage source, control means for maintaining a predetermined substantially constant amplitude quadrature vector potential drop across said capacitor, means for directly measuring the alternating current flowing through the capacitor which current is proportional to the capacitance of the capacitor, means coupled to said capacitor for obtaining the impedance potential drop across said capacitor, and means for comparing the phase of said impedance potential drop with the phase of said alternating current flowing through the capacitor to determine the component of said impedance potential drop that is in phase with said current, which component is proportional to the dissipation factor of said capacitor.

2. The system according to claim 1 further comprising means for applying a direct current potential across said unknown capacitor to duplicate actual circuit operating conditions and to determine the effect of these combined electrical stresses upon the capacitance and dissipation factor of said capacitor.

3. A measuring system for directly indicating the unknown capacitance of a capacitor comprising:

an alternating voltage source coupled to said capacitor, means for maintaining a substantially constant output frequency from said alternating voltage source, means for detecting the potential drop across said capacitor, means for comparing the phase of said potential drop to the phase of current through said capacitor to determine the quadrature component of said potential drop, a reference potential and means for comparing said quadrature component of potential drop thereto to obtain an error signal, means for varying the output of said alternating voltage source in response to said error signal whereby the quadrature component of potential drop across said capacitor is maintained at a substantially constant predetermined value, and means for directly measuring the alternating current flowing through the capacitor, which current is directly proportional to the capacitance thereof.

4. The system of claim 3 further comprising means for comparing the phase of potential drop across said capacitor to the phase of current through said capacitor to determine the in phase component of potential drop across said capacitor, which component is directly proportional to the dissipation factor of said capacitor.

5. The system of claim 4 further comprising means for applying a DC potential across said unknown capacitor to duplicate actual circuit operating conditions and to determine the effect of the combined electrical stresses upon the capacitance and dissipation factor of said capacitor.

6. A measuring system for directly indicating the unknown capacitance of a capacitor comprising:

an alternating voltage source having its output frequency stabilized by reference to the power line frequency coupled to said capacitor.

means for detecting the potential drop across said capacitor, means connected in series with said capacitor for directly measuring the current through said capacitor which current is directly proportional to the capacitance of said capacitor, means for converting said current to a potential proportional to said current and in phase therewith, means for vectorally combining said potential drop across said capacitor with said potential proportional to the current through said capacitor and in phase therewith to determine the component of potential drop across said capacitor that is in quadrature with the current through said capacitor, a reference potential and means for comparing said quadrature component thereto to determine an error signal, and means responsive to said error signal for controlling the output of said alternating voltage source whereby said quadrature component of potential drop is maintained at a predetermined substantially constant value.

7. In the method for determining the capacitance of a capacitor comprising the steps of passing an alternating current through said capacitor, controlling said current to thereby maintain a constant quadrature potential drop across said capacitor, and measuring said current to obtain an indication of the capacitance of said capacitor, the improvement which comprises the step of applying a DC bias voltage to said capacitor to simulate actual operating conditions and to determine the effect of combined electrical stresses upon the capacitance of said capacitor.

References Cited
UNITED STATES PATENTS

| 3,026,474 | 3/1962 | Pihl | 324—60 |
| 3,230,449 | 1/1966 | Kaiser | 324—60 |
| 3,378,765 | 4/1968 | Hilsenrath et al. | 324—60 |

OTHER REFERENCES

Queen, I. Measuring Capacity, Radio-Craft, July 1944, pp. 602, 603 and 635.

EDWARD E. KUBASIEWICZ, Primary Examiner